(12) United States Patent
Rodriguez et al.

(10) Patent No.: US 11,826,775 B2
(45) Date of Patent: Nov. 28, 2023

(54) AUTOMOTIVE PART IDENTIFICATION MARKING SYSTEM

(71) Applicant: CatMarks Manufacturing, LLC, East Haven, CT (US)

(72) Inventors: Milton Rodriguez, Clinton, CT (US); Jason Rodriguez, North Haven, CT (US)

(73) Assignee: CatMarks Manufacturing, LLC, East Haven, CT (US)

( * ) Notice: Subject to any disclaimer, the term of this patent is extended or adjusted under 35 U.S.C. 154(b) by 0 days.

(21) Appl. No.: 18/178,924

(22) Filed: Mar. 6, 2023

(65) Prior Publication Data

US 2023/0278068 A1    Sep. 7, 2023

Related U.S. Application Data

(60) Provisional application No. 63/426,215, filed on Nov. 17, 2022, provisional application No. 63/317,218, filed on Mar. 7, 2022.

(51) Int. Cl.

| | |
|---|---|
| *B05C 17/06* | (2006.01) |
| *C23F 1/16* | (2006.01) |
| *C23F 1/08* | (2006.01) |
| *B60R 13/10* | (2006.01) |

(52) U.S. Cl.
CPC .............. *B05C 17/06* (2013.01); *C23F 1/08* (2013.01); *C23F 1/16* (2013.01); *B60R 13/10* (2013.01)

(58) Field of Classification Search
CPC .................................. B05C 17/06; C23F 1/08
See application file for complete search history.

(56) References Cited

U.S. PATENT DOCUMENTS

| | | |
|---|---|---|
| 7,455,877 B2 | 11/2008 | Rodriguez |
| 7,566,473 B2 | 7/2009 | Rodriguez |
| 2005/0112275 A1* | 5/2005 | Rodriguez ................ G09F 3/00 427/258 |
| 2005/0112276 A1* | 5/2005 | Rodriguez ............. B05D 5/063 427/258 |
| 2008/0245768 A1* | 10/2008 | Cottrell .................. C09D 11/34 216/42 |
| 2014/0231387 A1* | 8/2014 | Holloway ............... C03C 15/00 216/36 |
| 2018/0242457 A1* | 8/2018 | Shpaisman ............... C23F 1/02 |

* cited by examiner

*Primary Examiner* — Binh X Tran

(74) *Attorney, Agent, or Firm* — DeLio Peterson & Curcio LLC; Brian G. Schlosser

(57) ABSTRACT

A method and system for creating readily identifiable discrete markings on an application surface of an object. The system comprises a stencil having a cutout openings forming a discrete identifier, and a marking reagent comprising an organic solvent, isopropyl alcohol, and a metal marking component. After applying the stencil to an application surface, the marking reagent is applied to the application surface via the cutout openings. The marking reagent may then etch the discrete identifier as well portions on an interior portion of the application surface. In some applications, the system may be applied to a surface having dirt and grease. In addition, marking reagent may embed a cured portion of the marking reagent within the well portions.

8 Claims, 11 Drawing Sheets

AUTOMOTIVE PART IDENTIFICATION MARKING SYSTEM

BACKGROUND OF THE INVENTION

1. Field of the Invention

The present invention relates to a method and system for creating readily identifiable discrete markings on an application surface of an object and, in particular to a method and system for creating a unique identification to be marked on the surface of vehicles and automotive parts.

2. Description of the Related Art

Unique alphanumeric identification numbers, such as vehicle identification numbers (VIN) and hull identification number (HIN), have been used for many years to provide databases to ensure proper registration and to track and return the theft of motor vehicles, marine craft, and the like. United States federal and state laws have been enacted which require these identifiers on several locations of land and marine vessels, and it has become common to mark such vessels in other locations beyond those required by law.

Recently, automobile parts, including catalytic converters and wheels, are being stolen at an alarming rate in countries around the world. In the United States, over 18,000 catalytic converters were stolen in the year 2021 alone. These automobile parts are being stolen for their highly desirable precious metals, including rhodium, palladium, and platinum. Once removed from an automobile, these parts can be sold to places which would reclaim these precious metals, primarily including scrap yards. The cost of replacing a stolen catalytic converter, wheels, or the like is substantial, and currently no form of identification or tracking exists for such parts.

U.S. Pat. Nos. 7,566,473 and 7,455,877 to Rodriguez disclose a method of identifying an object on a painted vehicle surface using a unique alphanumeric identification applied to the painted surface with a fluorescent material at a selected unrevealed location. After thoroughly cleaning the vehicle surface, the fluorescent material is applied and must be afforded adequate time to migrate into at least one paint layer of the vehicle surface. After application, any excess fluorescent material must be removed using a solvent. Once cured, the alphanumeric identification produced is only visible at an acute angle to the object surface without use of an ultraviolet light.

It would be advantageous to provide an etching or marking system using a unique and traceable identifier onto an application surface of vehicles or parts which are susceptible to theft using a marking reagent which creates an arduous and time-consuming removal of the identifier as a theft-deterrent, since the effort expended in removing the identifier from the vehicle or part would not be worth the gain in selling the part at scrap yards.

SUMMARY OF THE INVENTION

Bearing in mind the problems and deficiencies of the prior art, it is therefore an object of the present invention to provide an etched or marked unique and traceable identifier onto an application surface of vehicles or parts which are susceptible to theft using a process and marking reagent that can be completed expeditiously.

It is another object of the present invention to provide a method of creating a unique and traceable identifier using a highly frangible stencil, thereby creating an arduous and time-consuming removal of the identifier.

A further object of the present invention is to provide a system and method of creating a unique and traceable identifier which would act as an immediate theft-deterrent.

It is another object of the present invention to provide a marking system which can readily identified, quickly and efficiently applied, and which would provide an adequate deterrent to would-be thieves.

Yet another object of the present invention is to provide a system and method of creating a unique and traceable identifier which could be applied to an application surface without additional cleaning or other preparation of the surface.

Still other objects and advantages of the invention will in part be obvious and will in part be apparent from the specification.

The above and other objects, which will be apparent to those skilled in the art, are achieved in the present invention which is directed to a system for creating an identifier on an application surface of a vehicle or automotive part, comprising a stencil comprised of a layer of stencil material with two opposed surfaces, an adhesive layer on one surface of the stencil material, and a discrete identifier formed by cutout openings in the layer of stencil material. The system further comprises a marking reagent including an organic solvent in the range of 30-60% by weight, isopropyl alcohol in the range of 30-60% by weight, and a metal marking component in the range of 5-10% by weight. The metal marking component comprises a moderately volatile blend of alkyl ketones in the range of about 40-60% by weight, alkyl esters in the range of about 40-60% by weight, mineral acids in the range of about less than 10% by weight, and a blend of marking indicating dyes in the range of about less than 5% by weight. The stencil may be applied to the application surface and the marking reagent may then be applied to the application surface via the cutout openings to create the discrete identifier as well portions into an interior portion of the application surface.

In some embodiments, the stencil comprises a frangible stencil, and/or may be constructed of a material comprising vinyl or aluminum. The blend of marking indicating dyes may comprise 2,5-Thiophendiylbis(5-tert.-butyl-1,3-benzoxazol) in the range of about 90-100% by weight, and/or comprises pigmented dyes, fluorescent materials, or combinations thereof. The inorganic solvent may comprise methyl ethyl ketone or propylene glycol methyl ether. The mineral acid may comprise hydrochloric acid, nitric acid, sulfuric acid, phosphoric acid, boric acid, hydrobromic acid, hydroiodic acid, hydrofluoric acid, perchloric acid, or any combination thereof.

The present invention also provides a marking reagent for creating a unique identifier on an application surface of a vehicle or automotive part, comprising an organic solvent in the range of 30-60% by weight, isopropyl alcohol in the range of 30-60% by weight, and a metal marking component in the range of 5-10% by weight. The metal marking component comprises a moderately volatile blend of alkyl ketones in the range of about 40-60% by weight, alkyl esters in the range of about 40-60% by weight, mineral acids in the range of about less than 10% by weight, and a blend of marking indicating dyes in the range of about less than 5% by weight. After application of the marking reagent to the application surface, the marking reagent will create well portions onto an interior portion of the application surface without the application of heat or another form of activation energy.

In one or more embodiments, the blend of marking indicating dyes may comprise 2,5-Thiophendiylbis(5-tert.-butyl-1,3-benzoxazol) in the range of about 90-100% by weight, and/or comprises pigmented dyes, fluorescent materials, or combinations thereof. The inorganic solvent may comprise methyl ethyl ketone or propylene glycol methyl ether. The mineral acid may comprise hydrochloric acid, nitric acid, sulfuric acid, phosphoric acid, boric acid, hydrobromic acid, hydroiodic acid, hydrofluoric acid, perchloric acid, or any combination thereof.

The present invention also provides a method for identifying an object comprising providing a stencil including a layer of stencil material with two opposed surfaces, an adhesive layer on one surface of the stencil material, and a discrete identifier formed by cutout openings in the layer of stencil material. The method further comprises providing a marking reagent comprising an organic solvent in the range of 30-60% by weight, isopropyl alcohol in the range of 30-60% by weight, and a metal marking component in the range of 5-10% by weight, the metal marking component comprising a moderately volatile blend of alkyl ketones in the range of about 40-60% by weight, alkyl esters in the range of about 40-60% by weight, mineral acids in the range of about less than 10% by weight, and a blend of marking indicating dyes in the range of about less than 5% by weight. The method further includes applying the stencil to an application surface, applying the marking reagent to the application surface via the cutout openings, and etching, via the marking reagent, the discrete identifier as well portions onto an interior portion of the application surface.

In some embodiments, the stencil comprises a frangible material. The method may comprise performing a plurality of cuts on the layer of stencil material to form the discrete identifier as cutout openings. Further, the method may be performed on an application surface which includes dirt and grease. The application surface may comprise automobile rims or catalytic converters. The method may further comprise embedding a cured portion of the marking reagent within the well portions. In addition, etching via the marking reagent may occur without substantial horizontal migration which would distort the discrete identifier. The method may further include permitting the marking reagent to cure for a predetermined amount of time, and the predetermined amount of time may comprise about 4-5 minutes.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1:
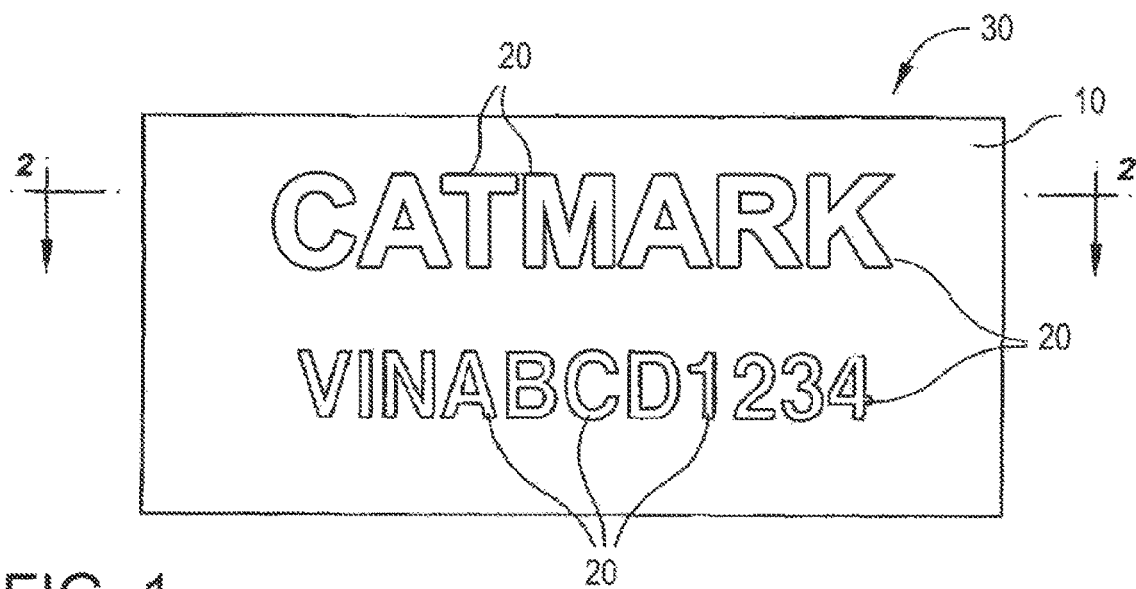
FIG. 1 is a to plan view of a stencil containing a partially cut unique alphanumeric identification.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc., may be used herein to describe various components, these components should not be limited by these terms.

These terms are only used to distinguish one component from another. For example, a first element could be termed a second element, and, similarly, a second element could be termed a first element, without departing from the scope of the present invention. As used herein, the singular forms "a", "an" and "the" are intended to include the plural forms as well, unless the context clearly indicates otherwise. Also, as used herein, the term "and/or" includes any and all combinations of one or more of the associated listed items. It will be further understood that the terms "include" and/or "including" when used herein, specify the presence of stated features, steps, operations, elements, and/or components, but do not preclude the presence or addition of one or more other features, steps, operations, elements, components, and/or groups thereof.

Relative terms such as "below," "above," "upper," "lower," "horizontal," "vertical," "top," "bottom," "rear," "front," "side," or the like may be used herein to describe a relationship of one element or component to another element or component as illustrated in the figures. It will be understood that these terms are intended to encompass different orientations of the device in addition to the orientation depicted in the figures.

Additionally, in the subject description, the words "exemplary," "illustrative," or the like are used to mean serving as an example, instance or illustration. Any aspect or design described herein as "exemplary" or "illustrative" is not necessarily intended to be construed as preferred or advantageous over other aspects or design. Rather, use of the words "exemplary" or "illustrative" is merely intended to present concepts in a concrete fashion.

In describing the embodiment of the present invention, reference will be made herein to FIGS. 1-22 of the drawings in which like numerals refer to like features of the invention.

The present invention provides a method and system for creating readily identifiable discrete markings on an application surface of an object which permits a unique object identification to be marked thereon. While the invention is particularly useful for vehicle parts such as catalytic converters found in automobiles, it may also be used for other objects that are vulnerable to theft or otherwise need to be tracked, including auto parts, marine recreational vessels including jet skis, wheels, alloy wheels, construction equipment, and building equipment. The unique and traceable identifier may be stored in a searchable database in the event that the object needs to be identified.

The preferred marking reagent to be utilized in connection with the present invention is a reagent that may include a pigmented chemical, a fluorescent pigmented chemical, an ultraviolet ("UV") ink, a chemical etching material, or any combination thereof. The marking reagent may be pigmented to result in any color desirable to produce a readily visible identification marking. Similarly, the chemical etching material may allow for a chemical engraving of the unique and traceable identifier, resulting in a non-uniform surface to which the marking reagent was applied, producing a tactile feel similar to Braille. Optionally, the marking reagent may be of an invisible pigment only viewable with the aid of a UV light source.

The marking reagent is preferably supplied in the form of a liquid, preferably as a mixture. In one or more embodiments, the marking reagent comprises an organic solvent such as propylene glycol methyl ether ("PM solvent") in the range of 30-60% by weight, isopropyl alcohol in the range of 30-60% by weight, ethyl alcohol in the range of 5-10%, and a metal marking component in the range of 5-10%.

In some embodiments, the marking reagent comprises an organic solvent such as methyl ethyl ketone (MEK) in the range of about 30-60% by weight, isopropyl alcohol in the range of about 30-60% by weight, and a metal marking component in an amount of about 5-10% by weight.

The metal marking component may comprise a moderately volatile blend of alkyl ketones in the range of about 40-60% by weight, alkyl esters in the range of about 40-60% by weight, mineral acids in the range of about less than 10% by weight, and a blend of marking indicating dyes in the range of about less than 5% by weight. The mineral acids may include hydrochloric acid, nitric acid, sulfuric acid, phosphoric acid, boric acid, hydrobromic acid, hydroiodic acid, hydrofluoric acid, perchloric acid, or any combination thereof.

The blend of marking indicating dyes of the metal marking component may comprise a pigment suitable to create any desired color or even optionally may include fluorescent materials. Such fluorescent materials may include fluorescent whitening agents such as coumarins, diamines formed by reaction of p-diaminostilbenedisulfonic acid and cyanuric chloride, p-distyrylbiphenyls, naphthotriazolylstilbenes and 1,3-disubstituted pyrazolines and is formulated into a suitable vehicle. Examples include alkylaminocoumarins, e.g., di-lower alkylaminocoumarins such as 7-dimethylamino-4-methylcoumarin, 7-diethylamino-4-methylcoumarin and the like.

In some embodiments, the blend of marking indicating dyes of the metal marking component may comprise fluorescent materials comprising 2,5-Thiophendiylbis(5-tert.-butyl-1,3-benzoxazol) in the range of about 90-100% by weight. In other embodiments, the blend of marking indicating dyes may comprise a pigment suitable to create any desired color. The blend of marking indicating dyes may include combinations of pigments and fluorescent materials suitable to achieve any application which would be understood by a person of skill in the art.

The marking reagent may be used to apply the unique identifier in any typical manner, such as by brushing or spraying of a liquid. However, the preferred manner of applying the marking reagent is via a stencil. A suitable stencil may be one which is laser cut, plasma cut, or any other form of stencil cutting which would be understood by one of ordinary skill in the art, including thermal printed stencils.

Figure 2:
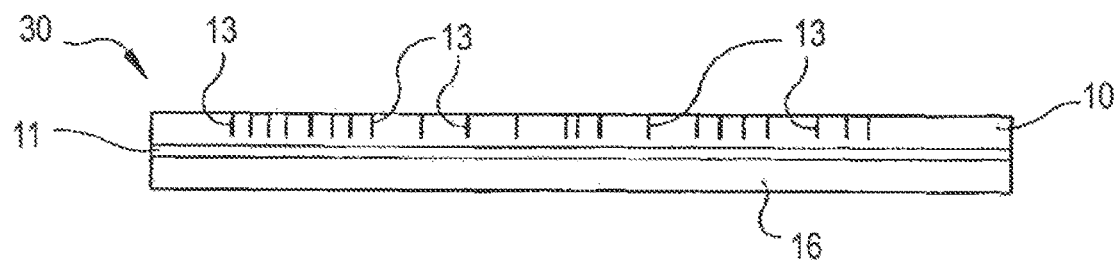
FIG. 2 is a side cross sectional view of the stencil of FIG. 1, along lines 2-2.

As shown in FIG. 1, stencil 10 comprises an otherwise convention layer of stencil material 30 having on a bottom surface thereof an adhesive layer 11 which is protected by a release layer 16 (see also FIG. 2). The unique discrete identifier 20 comprises a sequence of letters and numbers which identify the entity applying or authorizing the identification as well as the unique identification of the catalytic converter itself. In the example shown in FIG. 1, CATMARK is the entity applying the identification and VIN-ABCD1234 is the unique identification number assigned for the specified automotive part which the marking of the present invention is to be applied. As shown in FIG. 2, the alphanumeric characters of the unique identifier 20 are partially, but not completely, cut into the stencil layer 10 by slits 13 which extend from the top surface thereof. The stencil material 30 may be any acceptable material which would allow for the chemical marking of automotive parts, for example a vinyl or aluminum material. The stencil 30 may be laser-cut or thermal printed. In some embodiments, the identifier may include additional information such as a telephone number, a website address, or both.

Figure 3:
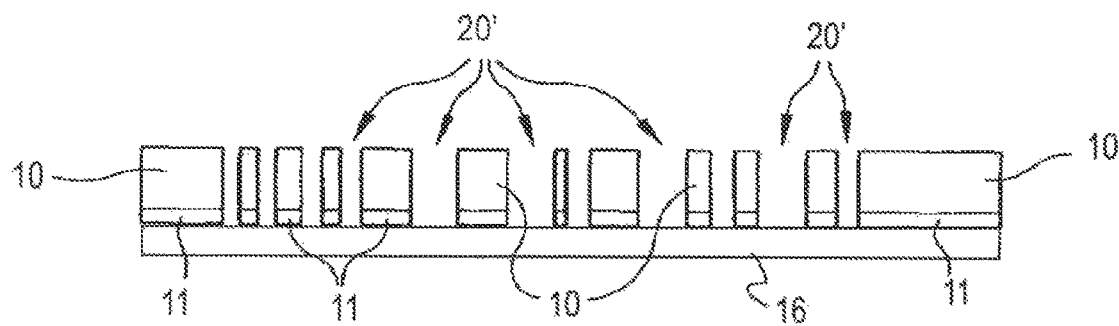
FIG. 3 is a side cross sectional view of the stencil of FIG. 2 with a portion of the stencil removed, leaving cut outs of the alphanumeric identification.
Figure 4:
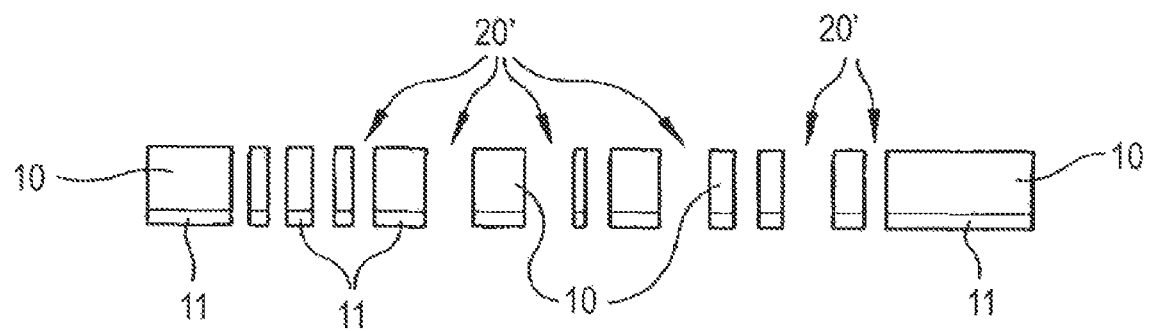
FIG. 4 is a side cross sectional view of the stencil of FIG. 3 with the release layer removed.
Figure 5:
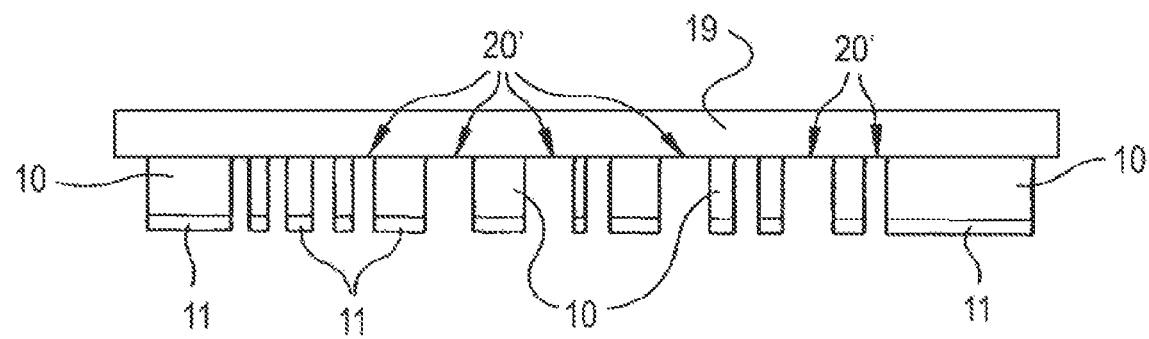
FIG. 5 is a side cross sectional view of an embodiment the stencil according to FIG. 4, including transfer paper.

To create the cutouts of the alphanumeric identifier 20, the slits 13 of the stencil material 10 are carefully peeled off from the release layer 16 so as to remove the stencil portions of the identifier 20 from the release layer, while the remaining stencil adhered to the release sheet 16 now has cutout openings 20' where the alphanumeric characters have been removed, as shown in FIG. 3. In order to apply the stencil 10 to the selected applied surface, the release layer 16 is removed and, as shown in FIG. 4, the remaining stencil sheet 10 and adhesive layer 11 are now ready to be applied to the upper surface of the application surface. In some embodiments, a transfer paper 19, which may be a contact paper, painters masking tape, or any other adhesive-based transfer paper which is known in the art may be applied to the upper surface of the stencil 10 to facilitate placement of the stencil on the application surface (see FIG. 5). In these embodiments, once the stencil 10 is applied to the application surface, the transfer paper 19 may be removed, leaving the stencil on the surface to which it was applied. Thus, the application of the marking reagent described below will be unaffected by the utilization of the transfer paper on the stencil.

The application surface on which the identifier of the present invention may be applied includes bare metal surface (including metals such as aluminum and iron, as well as metal alloys made therefrom). The marking reagent of the present invention may alternatively be suitable for finished surfaces including painted surfaces, clear-coat finished alloy surfaces, and finished or unfinished plastic surfaces. While traditional marking materials known in the art require the surface identified for marking be well cleaned with conventional cleaning products, preferably a solvent, to remove oil and grease therefrom, the embodiments of the present invention are not so limited. The unexpected results of the marking reagent of the present invention allows for marking on a surface which has not been cleaned prior to the application of the marking reagent, and may be applied to a surface containing dirt, oil, grease or debris thereon without causing discernable differences in effectiveness of the marking reagent of the present invention. Further, the marking reagent of the present invention may be applied at normal, ambient temperatures without the need to apply heat or another form of activation energy to achieve successful marking on the applied surface. In addition, the marking reagent of the present invention has seen particularly successful results in applying an alphanumeric identifier to vehicle wheels. While not wishing to be bound by theory, the success of the marking reagent on wheels and alloy wheels is likely do in large part to the marking reagents ability to be applied to a surface which has not been cleaned prior to application.

The stencil and subsequent alphanumeric identifier of the present invention may apply a unique identifier on automotive parts such as catalytic converters, wheels, or any other appropriate surface of a vehicle. While the present invention preferably applies an alphanumeric identifier to vehicles, the stencil and marking reagent of the present invention is suitable for any number of vessel application. The marking reagent may therefore apply a unique, alphanumeric identification to automobiles, auto parts, marine vessels including jet skis, wheels, alloy wheels, construction equipment, and building equipment. Thus, the present invention is suitable for a broad application for creating unique identifying markings on any object having a suitable application surface for marking.

Figure 6:
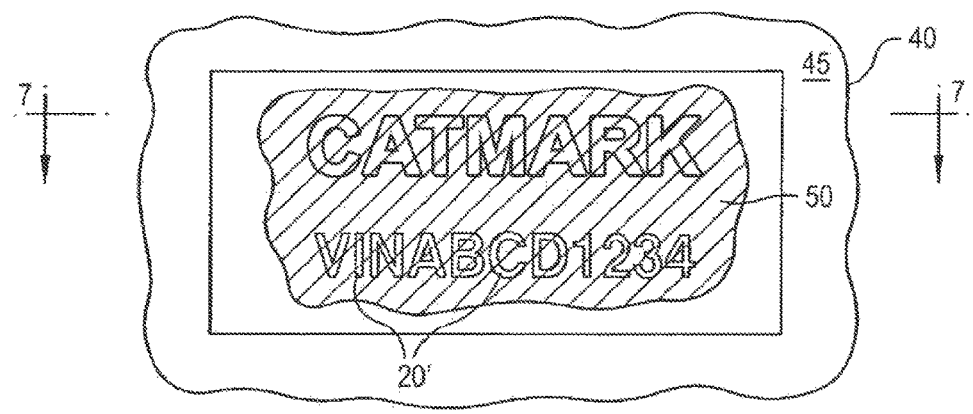
FIG. 6 is a top plan view of the stencil of FIG. 5 applied to an application surface, with marking reagent applied over the stencil and stencil cut outs.
Figure 7:
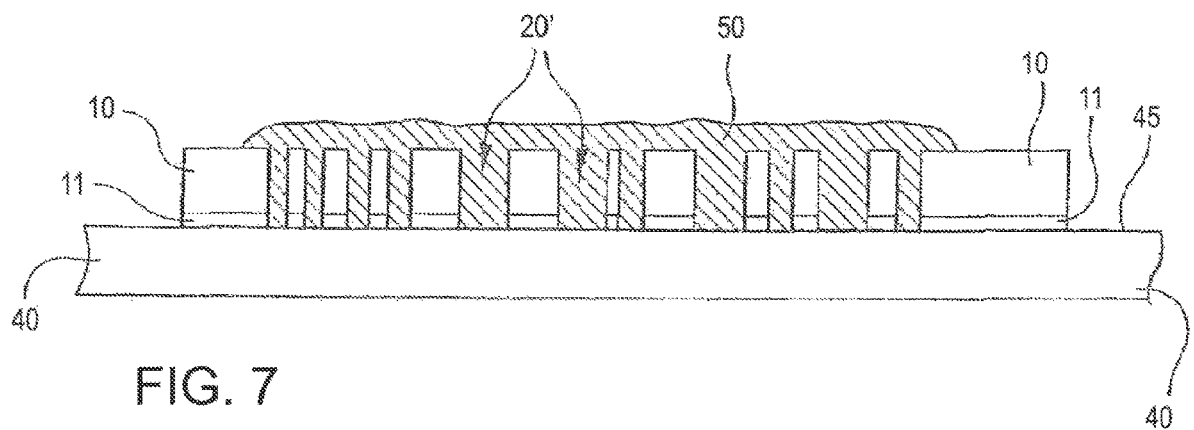
FIG. 7 is a side cross sectional view of FIG. 6, along lines 7-7.
Figure 8:
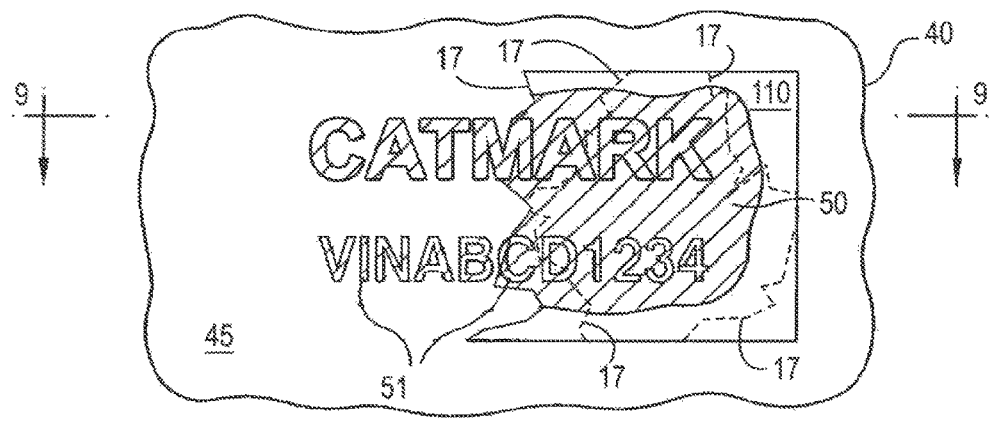
FIG. 8 is a top plan view of the stencil and applied marking reagent of FIG. 6 after the marking reagent has been cured, and the stencil is being removed.
Figure 9:
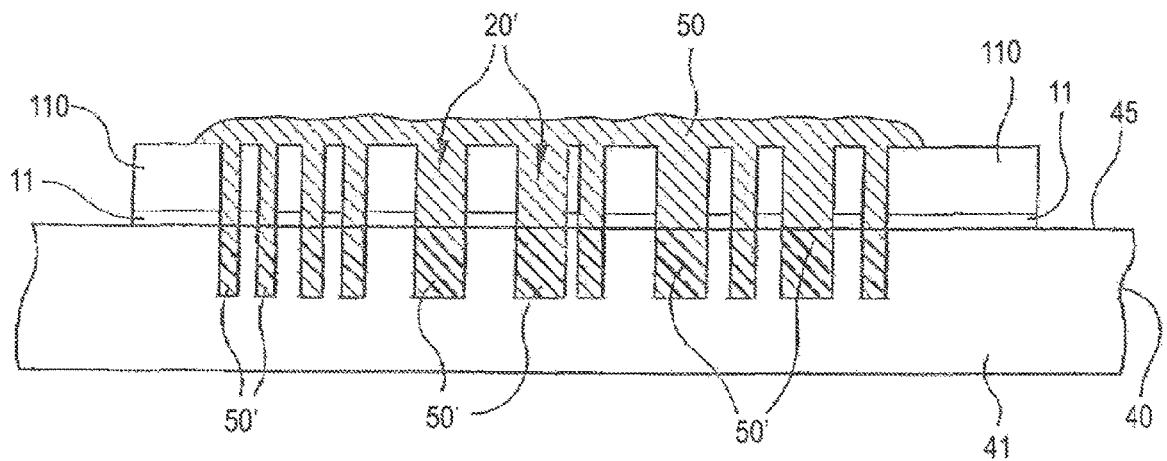
FIG. 9 is an embodiment of the side cross sectional view of FIG. 6, along lines 7-7.
Figure 10:
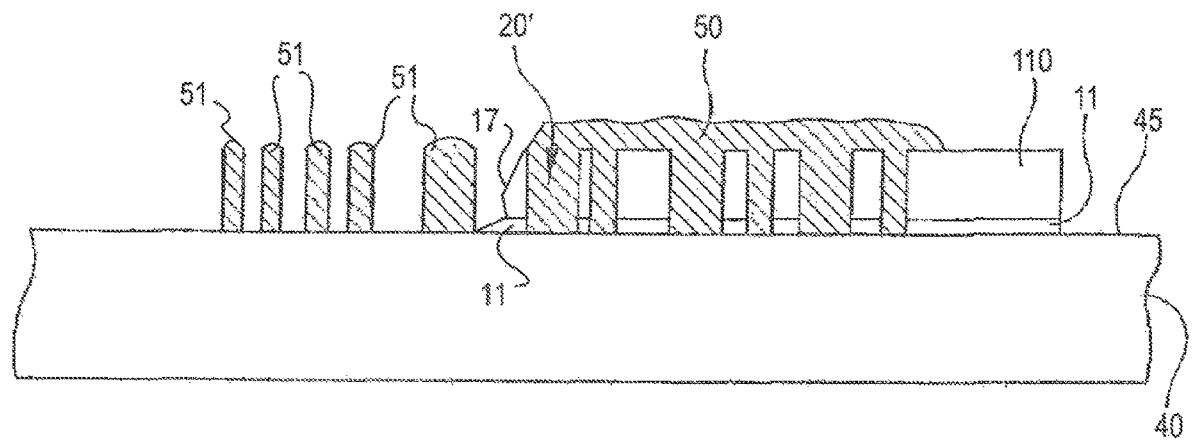
FIG. 10 is a side cross sectional view of an embodiment of the stencil of FIG. 8, along lines 9-9.
Figure 11:
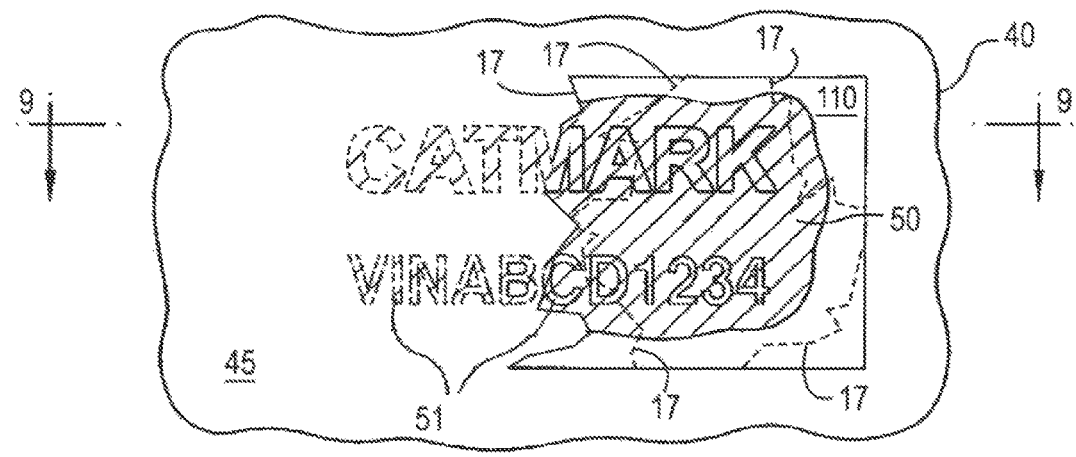
FIG. 11 is a top plan view of an embodiment of the stencil and applied marking reagent of FIG. 8 under normal viewing conditions and without the aid of a UV light source.
Figure 12:
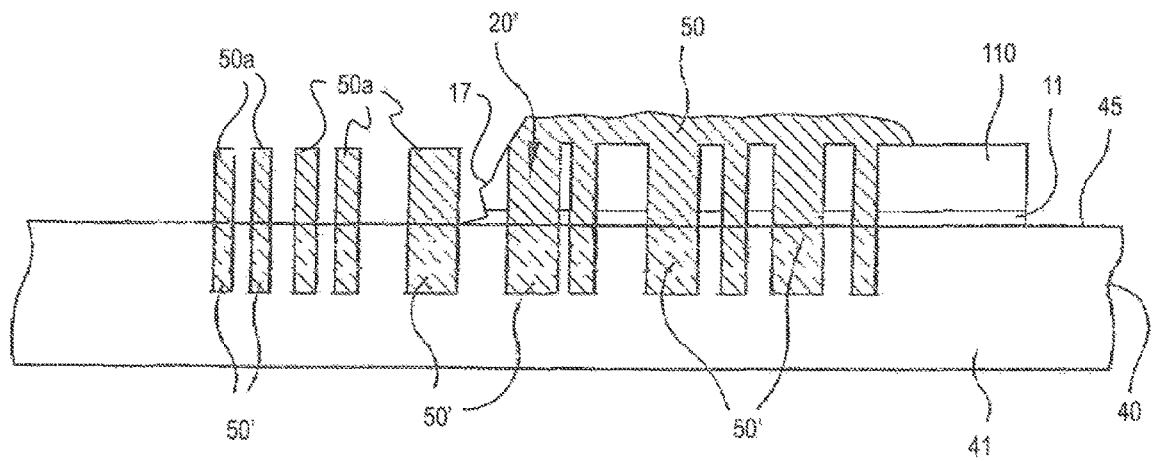
FIG. 12 is a side cross sectional view of an embodiment of the stencil of FIG. 11, along lines 12-12.

As shown in FIGS. 6 and 7, the stencil 10 and adhesive layer 11 are applied firmly to the outside surface 45 of a painted or unpainted application surface 40, 42. After the stencil adhesive layer 11 is applied to the outside surface 45, marking reagent 50 is applied onto the stencil 10 and into the cutout openings 20' for the alphanumeric identification, as also shown in FIGS. 6 and 7. The marking reagent 50 may be applied normally in an excessive amount in the cutout openings 20' and on top of the stencil 10. Preferable, a brush is used to apply the marking reagent 50 to the stencil 10.

Figure 13:
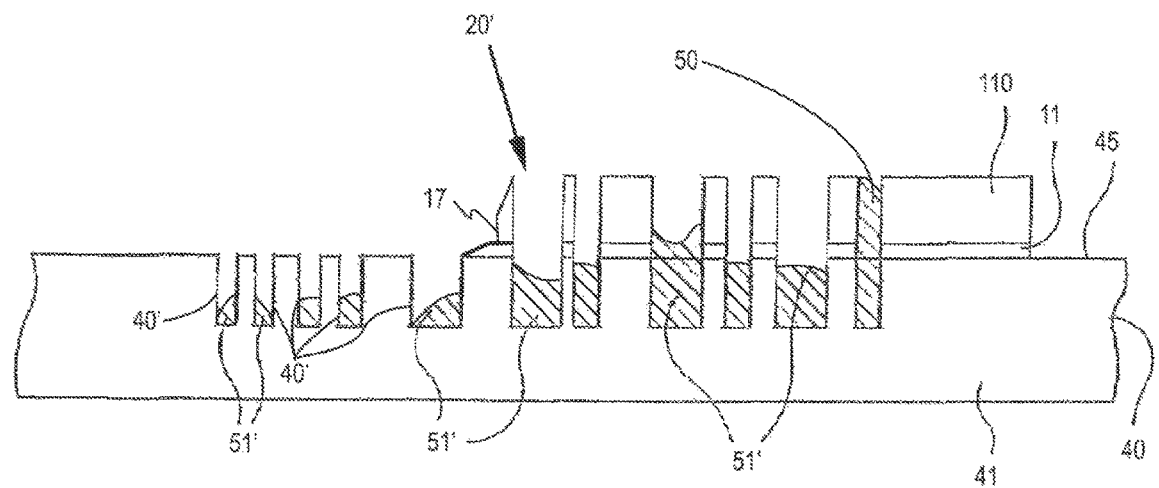
FIG. 13 is a side cross sectional view of an embodiment of the stencil of FIG. 11, along lines 12-12.
Figure 14:
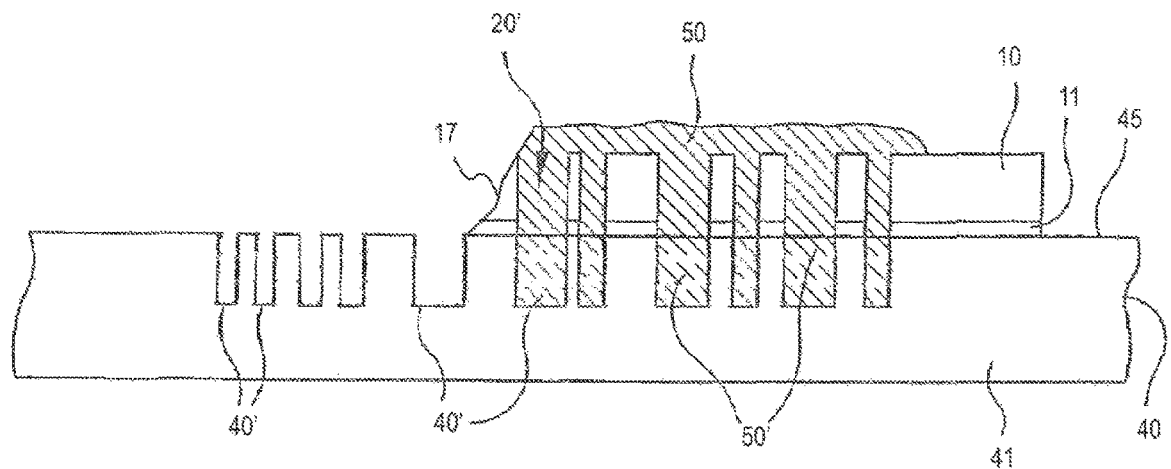
FIG. 14 is a side cross sectional view of an embodiment of the stencil of FIG. 11, along lines 12-12.
Figure 15:
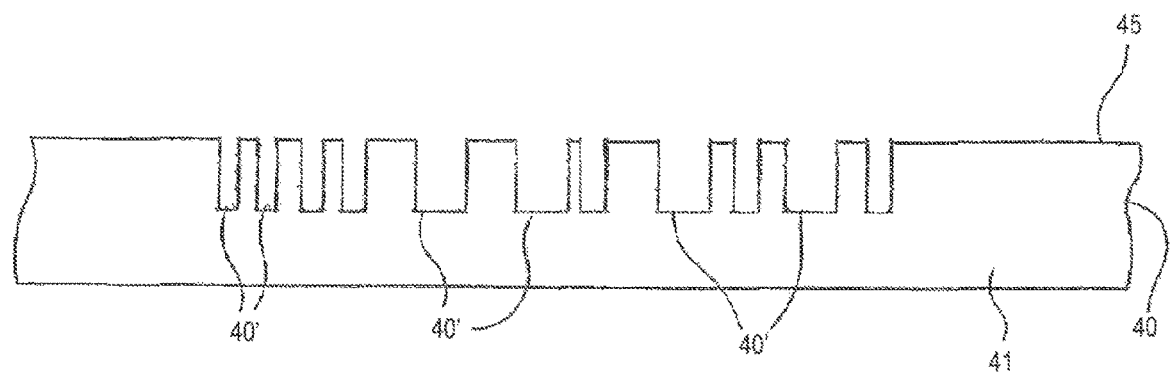
FIG. 15 is a side cross sectional view of an embodiment of the present invention after frangible stencil and marking reagent have been completely removed.

In one aspect of the present invention, like those depicted in FIGS. 14 and 15, it has been found that the marking reagent is capable of etching the unique alphanumeric identification as well portions 40' into an interior portion 41 of an unpainted application surface 40 without substantial horizontal migration, preserving the unique alphanumeric identifier. In some embodiments, like those depicted in FIGS. 9, 12, and 13, the marking reagent applied to an unpainted application surface may etch an interior portion of the application surface while simultaneously embedding a cured portion of the marking reagent therein and similarly without substantial horizontal migration which would distort the unique alphanumeric identification.

After application of the marking reagent to a stencil 10 applied to a painted or unpainted application surface 40,42, the marking reagent 50 is permitted to cure for a predetermined time, for example, about 4-5 minutes. Although the application of heat may accelerate the drying process, it has been found that unlike the marking materials of the prior art, the application of the marking reagent of the present invention may be done without any added activation energy or heat, and may be applied at essentially room temperature, i.e., approximately twenty-five degrees Celsius (25° C.) or even lower temperatures.

Figure 20:
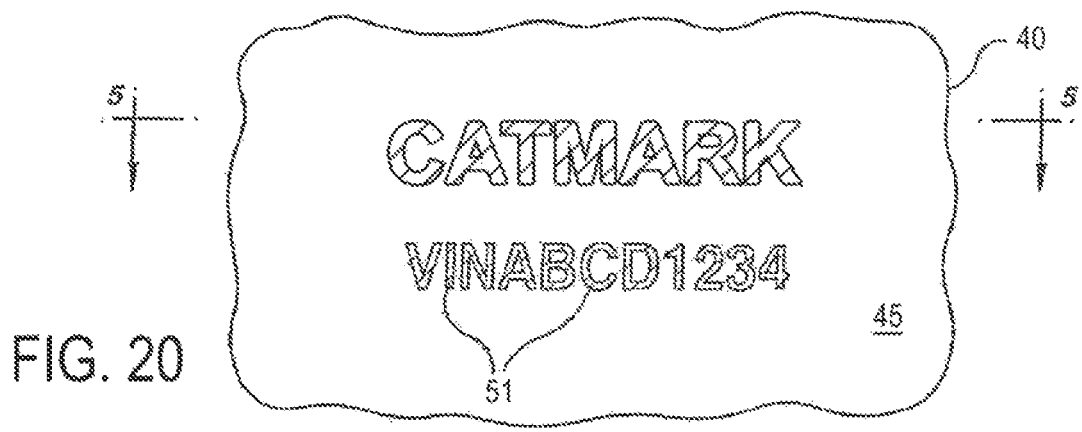
FIG. 20 is a top plan view of an embodiment of the marking reagent of an embodiment of the present invention after curing on an application surface.
Figure 21:
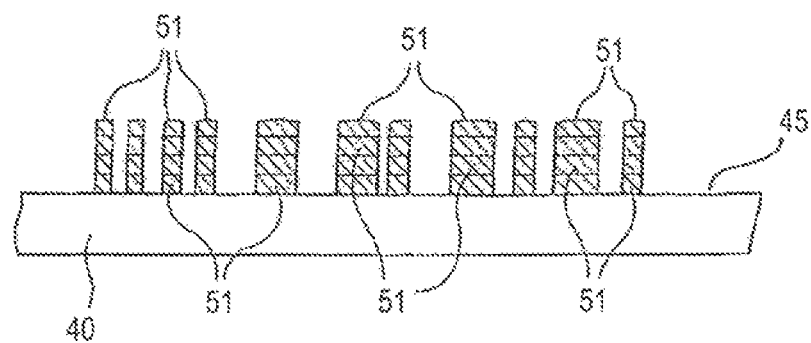
FIG. 21 is a side cross sectional view of an embodiment of the stencil of FIG. 20, along lines 5-5.
Figure 22:
FIG. 22 is a top plan view of an embodiment of the applied marking reagent of FIG. 21 utilizing a UV marking indicator dye under normal viewing conditions and without the aid of a UV light source.

In some embodiments, after the stencil 10 has been applied and the marking reagent 50 has been allowed to cure, the stencil may be removed from the application surface 40, leaving behind the alphanumeric identifier as a cured marked portion 51 above the application surface (when used with painted application surfaces such as the embodiments depicted in exemplary FIGS. 20-22) or chemically etched well portions 40' within the application surface (when used on unpainted application surfaces such as the embodiments depicted in exemplary FIG. 15). An unexpected result of the present invention is that sufficient curing of the marking reagent occurs within the predetermined time described above. Thus, after waiting the predetermined amount of time, an alphanumeric identifier is achieved on the portion of the painted/unpainted application surface without need for additional curing time or need for the marking reagent to migrate into the interior portion of painted application surfaces. The resulting method of applying the instant invention therefore provides for a quick and effortless alphanumeric identifier to an application surface which requires little to no initial preparation.

A further unexpected result of the present invention is that the application surface, whether painted or unpainted, does not need to be cleaned, or wiped with a solvent, cleaning agent, or otherwise, after the application of the marking reagent to create the unique alphanumeric identification. Thus, whether or not a stencil remains on the application surface, the marking reagent will clearly depict the unique alphanumeric identifier after curing without need to clean, further contributing to the ease in which the alphanumeric identifier may be applied to an application surface.

In the embodiments depicted in FIGS. 8, 10, and 20-22, the marking reagent may be formulated so as not to chemically etch within a painted surface 40, but instead create the alphanumeric identification as a cured marked portion 51 above the upper surface 45. In such embodiments, the blend of marking indicating dyes of the metal marking mixture found in the marking reagent 50 may be of any color suitable, leaving a highly viewable, pigmented alphanumeric identification as marked portion 51 after the marking reagent has cured. In some embodiments, the blend of marking indicating dyes may comprise fluorescent materials comprising 2,5-Thiophendiylbis(5-tert.-butyl-1,3-benzoxazol) in the range of about 90-100% by weight of the marking indicating dye. In such embodiments, the marking reagent 50 is formulated such that the fluorescent materials create a UV ink which renders the alphanumeric identification invisible under normal conditions, like those in FIG. 22 showing the marked portion 51 in phantom lines to indicate the lack of visibility of the unique identification without the aid of a UV light source. It should be understood by a person of skill in the art that any combination of the aforementioned marking indicating dyes may be utilized, and the present invention should not be precluded as limited to any one method of producing an alphanumeric identification.

In one or more embodiments, stencil 10 may be left on the application surface such that removal of either the stencil 10 or marking reagent 50 from the upper surface 45 will require a significant amount of time, acting as a deterrent to thieves. As shown in the exemplary FIGS. 8, and 10-14, stencil 110 comprises a highly frangible material, causing fracture lines 17 of the stencil as it is removed at multiple locations, resulting in a time consuming and piecemeal stencil removal. While the frangible stencil of FIGS. 8 and 10 may be applied to a painted application surface 40, frangible stencil 110 is particularly effective when applied to an unpainted application surface 40, like those of FIGS. 11-14. Removal of the frangible stencil on such unpainted application surfaces 42 will not remove the marking fluid portion 50a above the upper surface 45 (see FIGS. 10 and 12), nor will removal of the frangible stencil 110 remove any marking fluid which has been chemically etched and cured into the interior portion 41 of the unpainted application surface 42 (see FIGS. 12 and 13).

In some embodiments, like those depicted in FIG. 13, cured marked portion 51' may embed some or all of well portions 40' and/or the cutout openings 20' of frangible stencil 110 after curing, though any amount of the well portions may become embedded with marking fluid 50' after curing, and are not meant to be precluded. Thus, even after removal of the frangible stencil 110, would-be thieves would require further grinding/tampering on the application surface which would require time and expense greater than the profit to be made from the parts obtained in the theft.

Embodiments which utilize a UV ink are advantageous since marking reagent 50 is not apparently visible without the aid of a UV light. In these cases, a stolen automobile part with only the highly frangible stencil 110 removed would not display the unique identifier remaining as the cured marking liquid identifier 51, allowing any resale attempts to be thwarted while the cured marking liquid identifier remains on the automobile part. The marked surface viewed under normal conditions will thus be similar to the view shown in FIG. 11, with marking liquid identifier 51 shown in phantom lines to indicate the lack of visibility of the unique identification without the aid of a UV light source after the frangible stencil has been removed. In a similar manner, the embodiments which utilize chemical etching of marking reagent 50' are advantageous in that even if the marking reagent 50' were somehow removed (chemically or otherwise), the etching still results in well portions 40' on the unpainted application surface 42 forming the shape of the alphanumeric identifier, and would result in a non-uniform surface which tactilely would be similar to that of Braille or a tactile paving (see FIGS. 14 and 15). Thus, the marking reagent of the present invention is advantageous in that it will require additional grinding or sanding to remove the cured portion of the marking reagent from the application surface. Further grinding and sanding would be necessary in the embodiments having etched well portions to return the upper surface 45 to a uniform composition. Thus, the marking reagent 50 utilizing the frangible stencil described herein creates a unique alphanumeric identifier which may remain on the upper surface 45 even after the arduous removal of the frangible stencil 110, and will result in a more laborious removal of the identifier. The process of removing the marking reagent from an automobile part such as a catalytic converter or wheel would require tamper-evident and time-consuming means such as grinding or sanding, resulting in a deterrent to the theft of such parts marked using the stencil and marking reagent of the present invention.

Figure 16A:
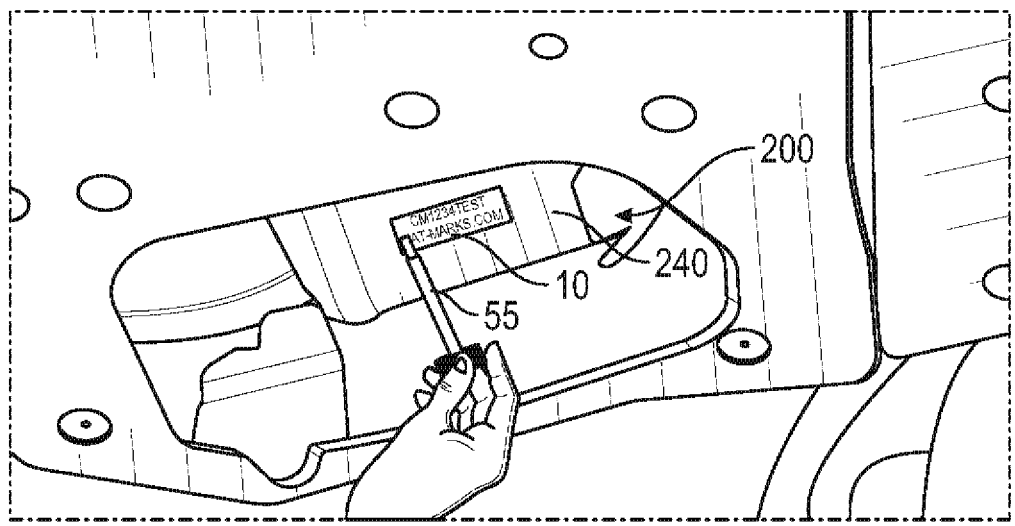
FIG. 16A is a perspective view of an unpainted automotive part before application of the embodiments of the present invention.
Figure 16B:
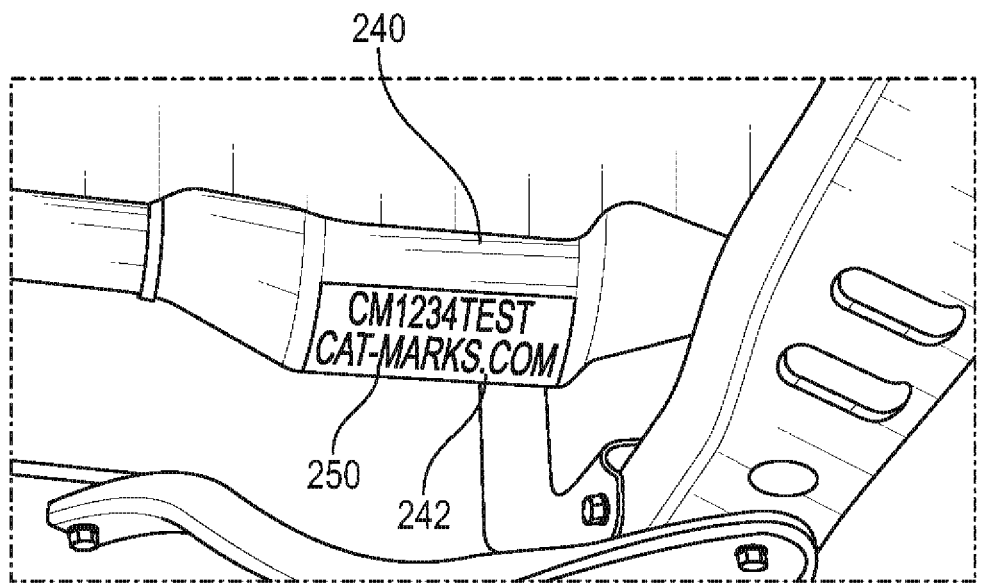
FIG. 16B is a perspective view of the unpainted automotive part after application of the embodiments of the present invention, and removal of the stencil.
Figure 17:
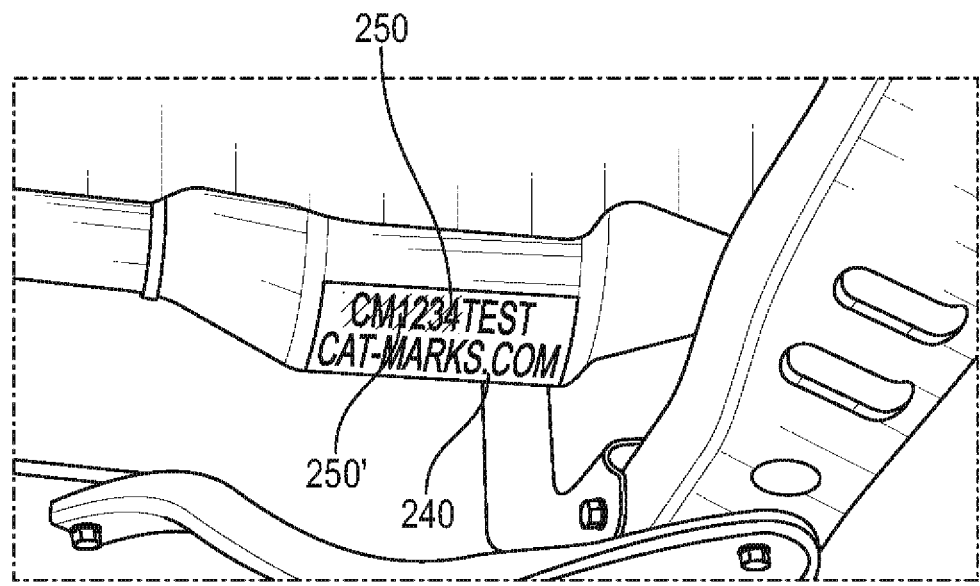
FIG. 17 is a perspective view of the automobile part of FIGS. 16A and 16B, after tampering of the unique identifier has been attempted.

Turning now to FIGS. 16A, 16B and 17, an embodiment of the present invention is shown for applying a unique identifier to an unpainted automotive part 200. As shown exemplary FIG. 16A, after application of a stencil 10 containing the alphanumeric identifier cutout in accordance with the embodiments described above, brush 55 including the marking reagent is applied to the application surface 240 of the unpainted automotive part 200, which may contain soiling due to dirt or grease. As shown in FIG. 16B, even after removal of the stencil 10 or frangible stencil 110, the unique identifier 250 is visible within the application surface 240 and has been formed through well portions 242 which may be chemically etched on an interior portion of application surface 240. In accordance with the previous embodiments described herein, the marking reagent may be pigmented or UV fluorescent such that a pigmented or UV fluorescent material remains on the unpainted application surface 240 or within well portions 242 even after removal of the stencil. Turning now to FIG. 17, a portion of application surface 240 has been sanded, grinded, or the like in an attempt to remove the unique identifier 250 from the application surface. As depicted, the unique identifier is still visible in sanded portion 250' of the application surface. Thus, the marking reagent and method of application of the present invention produce a highly visible unique identifier on an application surface that requires significant grinding/sanding to remove. Thus, not only does the marking reagent create a deterrent to theft of the automotive part, but is tamper-evident to any third party, calling into question the validity of any attempted sale to the third party by the would-be thief.

Figure 18A:
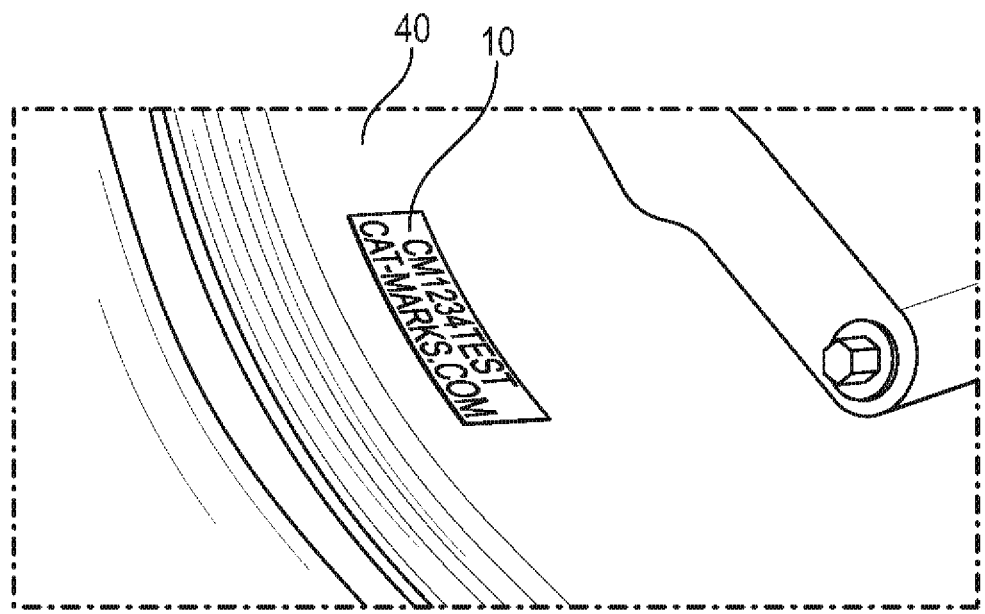
FIG. 18A is a perspective view of the method of applying an embodiment of the marking reagent of the present invention to an application surface.
Figure 18B:
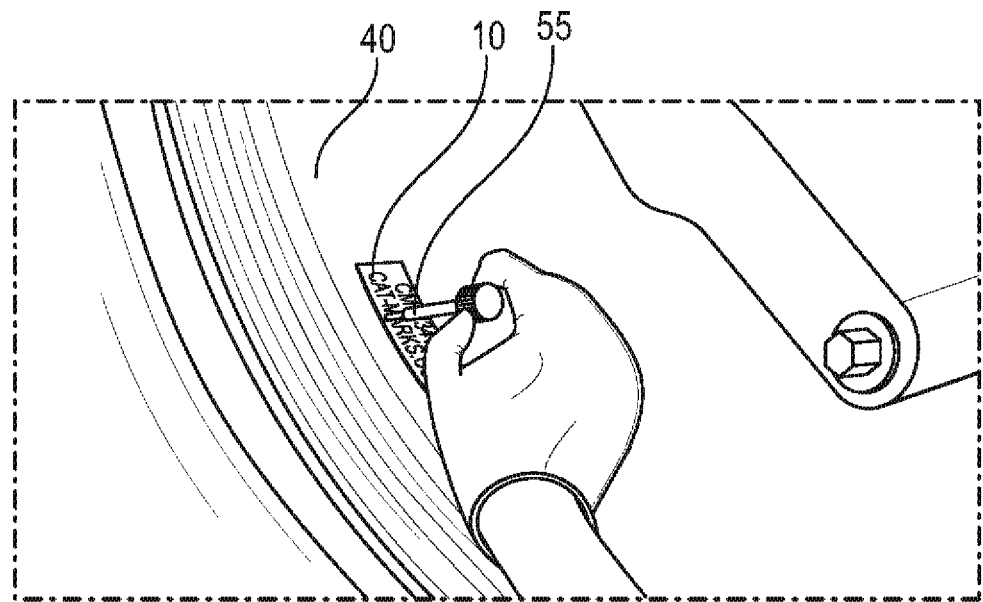
FIG. 18B is a perspective view of the method of applying an embodiment of the marking reagent of the present invention to an application surface.
Figure 19:
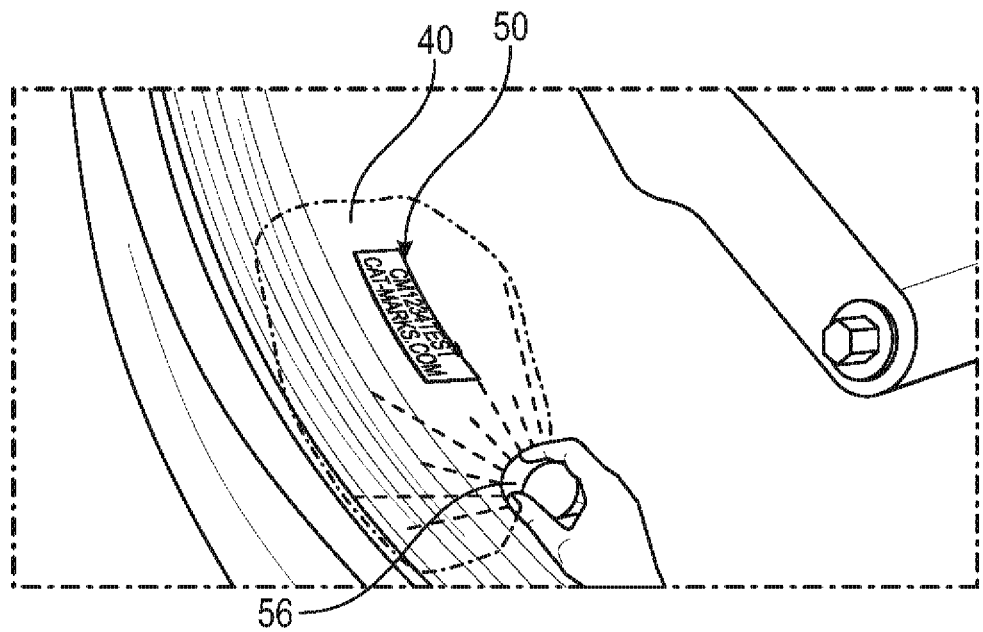
FIG. 19 is a perspective view of the method of viewing the application surface of FIGS. 18A and 18B, after application of the marking reagent of the present invention.

FIGS. 18A, 18B, and 19 depict the application of the marking reagent and the method of viewing the marking reagent comprising UV fluorescent materials on a painted application surface 40, respectively. After application of a stencil 10 containing the alphanumeric identifier cutout in accordance with the embodiments described above, marking reagent applied to a brush 55 is subsequently transferred to a painted and finished application surface 40 and stencil 10 (see FIG. 18B). After allowing the marking reagent to dry and affix to the application surface 40 in accordance with the previously described embodiments, stencil 10 is removed, leaving an invisibly marked identifier above the application surface 40. As seen in FIG. 19, the marking reagent 50 is only visible upon application of a UV light source 56, providing a marked surface which is not readily apparent to would-be thieves, and allows for a method of verifying the authenticity of a marked object. Since the application surface 40 requires a specialty light source to determine if the object has been marked, the present invention provides for an antitheft device which is easily applied, yet highly effective.

Thus, the present invention provides one or more of the following advantages: a unique identifying system to parts which are susceptible to theft; an arduous and time-consuming anti-theft means for automobile parts; a highly frangible stencil for use on automobile parts; an engraved or etched identification using a marking reagent which may be used in conjunction with a stencil as a theft deterrent; and a pigmented marking reagent used in conjunction with a stencil which could be visibly pigmented or invisible without the aid of a UV light source.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for identifying an object comprising:
   providing a stencil comprising a layer of stencil material with two opposed surfaces, an adhesive layer on one surface of the stencil material, and a discrete identifier in the layer of stencil material;
   providing a marking reagent comprising an organic solvent in the range of 30-60% by weight, isopropyl alcohol in the range of 30-60% by weight, and a metal marking component in the range of 5-10% by weight, the metal marking component comprising a blend of alkyl ketones in the range of about 40-60% by weight, alkyl esters in the range of about 40-60% by weight, mineral acid I the range of about less than 10% by weight, and a blend of marking indicating dyes in the range of about less than 5% by weight;
   applying the stencil to an application surface;
   applying the marking reagent to the application via cutout openings on the stencil; and
   etching, via the marking reagent, the discrete identifier as well portions onto an interior portion of the application surface.

2. The method of claim 1 wherein the stencil is frangible such that fracture lines are produced at multiple locations of the stencil upon removal.

3. The method of claim 1, wherein the application surface includes dirt and greased.

4. The method of claim 1, wherein the application surface comprises automobile rims or catalytic converters.

5. The method of claim 1, further comprising embedding a cured portion of the marking reagent within the well portion.

6. The method of claim 1, wherein etching via the marking reagent occurs without distortion of the discrete identifier due to migration of the marking reagent in a direction parallel to the application surface.

7. The method of claim 1, further comprising permitting the marking reagent to cure for a predetermined amount of time.

8. The method of claim 7, wherein the method further comprises:
   performing a plurality of cuts on the layer of stencil material to form the discrete identifier as cutout openings.

* * * * *

UNITED STATES PATENT AND TRADEMARK OFFICE
CERTIFICATE OF CORRECTION

| | | |
|---|---|---|
| PATENT NO. | : 11,826,775 B2 | Page 1 of 1 |
| APPLICATION NO. | : 18/178924 | |
| DATED | : November 28, 2023 | |
| INVENTOR(S) | : Milton Rodriguez and Jason Rodriguez | |

It is certified that error appears in the above-identified patent and that said Letters Patent is hereby corrected as shown below:

In the Claims

Column 12, Line 3, change "acid I" to "acids in"
Column 12, Line 7, change "application via" to "application surface via"

Signed and Sealed this
Twentieth Day of February, 2024

Katherine Kelly Vidal
*Director of the United States Patent and Trademark Office*